United States Patent
Carlsson

(10) Patent No.: US 10,181,867 B2
(45) Date of Patent: Jan. 15, 2019

(54) CREST FACTOR REDUCTION IN A RADIO TRANSMITTER

(71) Applicant: Telefonaktiebolaget L M Ericsson (publ), Stockholm (SE)

(72) Inventor: Torsten John Carlsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 30 days.

(21) Appl. No.: 14/878,110

(22) Filed: Oct. 8, 2015

(65) Prior Publication Data
US 2017/0104501 A1 Apr. 13, 2017

(51) Int. Cl.
*H04L 27/00* (2006.01)
*H04B 1/04* (2006.01)
*H04L 27/26* (2006.01)

(52) U.S. Cl.
CPC ....... *H04B 1/0475* (2013.01); *H04L 27/2614* (2013.01); *H04L 27/2623* (2013.01)

(58) Field of Classification Search
CPC . H04B 1/475; H04B 1/0475; H04L 27/26142; H04L 27/2614
USPC ......................................................... 375/296
See application file for complete search history.

(56) References Cited

U.S. PATENT DOCUMENTS

| 5,835,536 A * | 11/1998 | May | H04L 27/2614 375/260 |
| 6,091,932 A * | 7/2000 | Langlais | H04L 5/023 348/E7.049 |
| 6,584,160 B1 * | 6/2003 | Amrany | H04L 27/2614 375/222 |

(Continued)

FOREIGN PATENT DOCUMENTS

| WO | WO 2008074801 A1 * | 6/2008 | ......... H04L 27/2624 |
| WO | WO 2014085976 A1 * | 6/2014 | ............... H04L 1/20 |
| WO | WO 2014146235 A1 * | 9/2014 | ........... H04L 27/367 |

OTHER PUBLICATIONS

Kim, Wan-Jong et al., "An efficient crest factor reduction technique for wideband applications" Springer Science+Business Media, Apr. 2007.*
W. J. Kim et al. "Doherty Feed-Forward Amplifier Performance Using a Novel Crest Factor Reduction Technique," in IEEE Microwave and Wireless Components Letters, vol. 17, No. 1, pp. 82-84, Jan. 2007.*

(Continued)

*Primary Examiner* — Berhanu Tadese
(74) *Attorney, Agent, or Firm* — Murphy, Bilak & Homiller, PLLC

(57) ABSTRACT

Crest factor reduction techniques and apparatus provide good performance while reducing the impact to power consumption and implementation cost. An example method begins with identifying multiple non-overlapping and separated signal segments in a signal made up of a sequence of digital signal values, each identified segment being an interval in which at least one the digital signal values exceeds a predetermined threshold. For each identified signal segment, an overshoot vector representing the extent by which the identified signal segment exceeds the predetermined threshold is calculated. Each overshoot vector is separately filtered with a digital filter having one or more passbands corresponding to in-band portions of the signal. Each filtered overshoot vector is separately scaled, in some embodiments, and each scaled, filtered, overshoot vector is subtracted from the corresponding portion of the signal, to obtain a compensated signal having a reduced crest factor.

23 Claims, 4 Drawing Sheets

(56) References Cited

U.S. PATENT DOCUMENTS

| | | | | |
|---|---|---|---|---|
| 6,636,555 B1* | 10/2003 | Frank | | H04L 5/06 |
| | | | | 375/146 |
| 7,103,097 B1* | 9/2006 | Duvaut | | H04L 27/2614 |
| | | | | 375/222 |
| 7,266,354 B2* | 9/2007 | Jian | | H04B 1/707 |
| | | | | 375/E1.002 |
| 7,376,197 B2* | 5/2008 | Berangi | | H04B 1/0475 |
| | | | | 375/285 |
| 7,773,678 B2* | 8/2010 | Marsili | | H04K 1/00 |
| | | | | 375/130 |
| 7,995,975 B2* | 8/2011 | Sundstrom | | H04L 27/2624 |
| | | | | 455/116 |
| 8,150,338 B2* | 4/2012 | Sundstrom | | H04L 27/2624 |
| | | | | 455/116 |
| 8,204,158 B2* | 6/2012 | Bright | | H04L 25/03834 |
| | | | | 375/147 |
| 8,792,197 B1* | 7/2014 | Wilson | | G11B 5/02 |
| | | | | 360/46 |
| 8,917,141 B2* | 12/2014 | Hellberg | | H03F 1/0288 |
| | | | | 330/124 R |
| 8,948,303 B1* | 2/2015 | Van Cai | | H04L 27/2624 |
| | | | | 375/296 |
| 9,100,253 B2* | 8/2015 | Mundarath | | H04L 27/2624 |
| 2003/0137949 A1* | 7/2003 | Roux | | H04B 1/707 |
| | | | | 370/317 |
| 2004/0005014 A1* | 1/2004 | Talwar | | H04L 27/2624 |
| | | | | 375/295 |
| 2004/0014436 A1* | 1/2004 | Lipka | | H03G 3/3042 |
| | | | | 455/112 |
| 2004/0042559 A1* | 3/2004 | Jaenecke | | H03F 1/0205 |
| | | | | 375/297 |
| 2004/0052314 A1* | 3/2004 | Copeland | | H04B 1/707 |
| | | | | 375/296 |
| 2004/0086054 A1* | 5/2004 | Corral | | H04L 27/2614 |
| | | | | 375/260 |
| 2005/0008094 A1* | 1/2005 | Kramer | | H04B 1/709 |
| | | | | 375/296 |
| 2005/0069045 A1* | 3/2005 | Laaser | | H04L 27/2618 |
| | | | | 375/260 |
| 2006/0154622 A1* | 7/2006 | Piirainen | | H03F 1/0205 |
| | | | | 455/115.1 |
| 2006/0171486 A1* | 8/2006 | Tan | | H04L 27/2624 |
| | | | | 375/296 |
| 2007/0152600 A1* | 7/2007 | Nerone | | H05B 41/2926 |
| | | | | 315/209 R |
| 2007/0152601 A1* | 7/2007 | Nerone | | H02M 1/15 |
| | | | | 315/209 R |
| 2007/0152603 A1* | 7/2007 | Nerone | | H05B 41/2886 |
| | | | | 315/247 |
| 2007/0201582 A1 | 8/2007 | Okada et al. | | |
| 2008/0002779 A1* | 1/2008 | Carsello | | H04L 27/2624 |
| | | | | 375/260 |
| 2008/0150625 A1* | 6/2008 | Sundstrom | | H04L 27/2624 |
| | | | | 327/551 |
| 2010/0150256 A1 | 6/2010 | Morris et al. | | |
| 2011/0268167 A1* | 11/2011 | Sundstrom | | H04L 27/2624 |
| | | | | 375/224 |
| 2012/0093209 A1* | 4/2012 | Schmidt | | H04L 27/2624 |
| | | | | 375/224 |
| 2012/0093210 A1* | 4/2012 | Schmidt | | H04L 27/2624 |
| | | | | 375/224 |
| 2013/0177057 A1* | 7/2013 | Pavel | | H04L 25/08 |
| | | | | 375/224 |
| 2013/0266082 A1* | 10/2013 | McGowan | | H04L 27/2614 |
| | | | | 375/260 |
| 2013/0315320 A1* | 11/2013 | McGowan | | H04L 27/2614 |
| | | | | 375/260 |
| 2013/0329819 A1* | 12/2013 | Gu | | H04L 27/2623 |
| | | | | 375/261 |
| 2014/0044215 A1* | 2/2014 | Mundarath | | H04L 27/2624 |
| | | | | 375/297 |
| 2014/0341316 A1* | 11/2014 | Yu | | H04L 27/2624 |
| | | | | 375/296 |
| 2015/0145599 A1* | 5/2015 | Liou | | H03F 1/0222 |
| | | | | 330/291 |
| 2017/0104501 A1* | 4/2017 | Carlsson | | H04B 1/0475 |

OTHER PUBLICATIONS

Time-Division Multiplexing (TDM)—Definition, Sep. 2005—Internet Citation—.*
G. K. Srivastava et al., Crest factor reduction for carrier aggregated OFDM systems, IEEE, SoftCOM, 2012.*

\* cited by examiner

CREST FACTOR REDUCTION IN A RADIO TRANSMITTER

TECHNICAL FIELD

The present disclosure is generally related to radio transmitter circuits, and is more particularly related to reducing the peak-to-average ratio in transmitted signals.

BACKGROUND

Radio amplifiers are intended to amplify radio signals without adding distortion. With power amplifiers in particular, it is important that this is also done with good power efficiency. All analog amplifiers have limitations with respect to output power, and the power efficiency of amplifiers generally is better when the amplifiers are operated so that their output signals are close to the amplifier's maximum output power. However, this is also the operating region where nonlinearities are manifest, introducing unwanted spurious responses in the amplifiers' output signals.

These nonlinearities are manageable for simple, constant-envelope signals, like those used in the conventional GSM system. However, the modulated baseband signals used in the Long-Term Evolution (LTE) system developed by members of the $3^{rd}$-Generation Partnership Project (3GPP) and the composite signals used in systems using aggregated carriers typically have very large peak-to-average ratios. Accordingly, it is difficult to develop power amplifiers that can operate with high efficiencies with these signals, while still introducing low enough levels of non-linear distortion.

To mitigate this problem, techniques referred to as crest factor reduction (CFR) methods are often used to reduce the signal dynamics of the baseband signal. With these approaches generally, the input signal to a power amplifier is modified, or "pre-processed," so as to reduce the peak-to-average ratio of the signal, while avoiding the introduction of excessive distortion into the signal via the pre-processing.

Traditional solutions use an iterative approach to this pre-processing, combining amplitude limiters and in-band filtering. One solution is to hard-limit the signal, to remove the peaks from the signal, followed by in-band filtering of the hard-limited signal. Typically, multiple iterations are used to get good performance. This approach, however, creates very tough requirements on the filters used for the in-band filtering.

Another alternative is to calculate a signal that represents that part of the input signal where the signal amplitude is above a threshold amplitude value. This calculated signal is then filtered, with an in-band filter, and then this filtered signal is subtracted from the original input signal. This approach imposes less stringent requirements on the filters used to provide the in-band filtering. This method and related methods can work well if several iterations are performed, but the cost of these solutions, in terms of component size and/or current consumption, can be high, which makes these techniques unsuitable for small-cell solutions, such as pico cells, femto cells, home base stations, etc., where unit size and power consumption are especially important issues.

Still another approach is to identify areas of the signal where the signal is above a threshold value, followed by applying a smoothed reduction in gain for the signal, in the vicinity of each overshoot, such that the signal peaks fall below the threshold.

Common to all of these conventional methods is that they aim to limit the amplitude of the signal in such a way that the signal's peak amplitude remains below a certain threshold. To do this, the original signal has to be distorted. In other words, the compensated signal, with reduced peaks, can be viewed as the original signal added to a distortion signal. Strict requirements apply to both out-of-band characteristics of this distortion, so as to avoid the transmitting of excessive distortion on out-of-band frequencies, and in-band distortion, so as to avoid having in-band distortion that disturbs the information signal to an undesirable extent. For all solutions, there is a careful balance between in-band and out-of-band distortion.

This crest factor reduction problem, however, becomes more difficult to solve when the aggregated signal consists of non-contiguous carriers. Conventional techniques can be used to perform the crest factor reduction with adequate quality in these cases, but these methods are typically implemented in situations where calculation efforts, power consumption, and implementation cost are of relatively minor importance, e.g., in large and powerful radio base stations. Radio communication systems are more and more working with high-speed/small-cell scenarios, however. For these scenarios it is important to have methods that perform adequate crest factor reduction with minimal impacts to power consumption and implementation cost. These same considerations apply to crest factor reduction implementations in mobile units, as well as in small-cell radio base stations.

SUMMARY

Embodiments of the present invention include crest factor reduction techniques and apparatus that provide good performance while reducing the impact to power consumption and implementation cost. According to some embodiments, the implementation is split into two parts, where a first part detects peaks and identifies portions of the signal for further processing, and a second part creates cancellation components working only with those identified portions of the signal.

An example method of processing a signal in a radio transmitter, according to some embodiments, begins with identifying, in a sequence of digital signal values making up the signal, a plurality of non-overlapping and separated signal segments, each identified signal segment corresponding to an interval of the signal in which the amplitude of at least one of the digital values exceeds a predetermined threshold value. This identifying operation includes ensuring that each identified signal segment is separated from all other identified signal segments by at least a predetermined number of digital signal values. For each identified signal segment, an overshoot vector representing the extent by which the identified signal segment exceeds the predetermined threshold is calculated. Each overshoot vector is separately filtered with a predefined digital filter having one or more passbands corresponding to in-band portions of the signal. Each filtered overshoot vector is separately scaled to have a maximum amplitude equal to or approximately equal to the maximum amplitude of the corresponding identified signal segment, and each scaled, filtered, overshoot vector is subtracted from the corresponding portion of the digital signal values making up the signal, to obtain a compensated signal having a reduced crest factor.

In some embodiments, the compensated signal or a signal derived from the compensated signal is then used to modulate a carrier signal.

The method summarized above may be iterated, to improve performance. Thus, in some embodiments, the method further comprises generating a second compensated signal by calculating a second overshoot vector, for each of one or more of the identified signal segments, the second overshoot vector representing the extent by which the digital signal values of the compensated signal exceed the predetermined threshold within the interval corresponding to the identified signal segment. Each second overshoot vector is separately filtered with the predefined digital filter, and each filtered second overshoot vector is separately scaled to have a maximum amplitude equal to or approximately equal to the maximum amplitude of the compensated signal within the interval of the corresponding identified signal segment. Each scaled, filtered, second overshoot vector is then subtracted from the corresponding portion of the digital signal values making up the compensated signal, to obtain the second compensated signal.

In some embodiments of the methods summarized above, the identifying of at least a first one of the discrete and separated signal segments comprises identifying a consecutive subset of digital signal values, among the digital signal values making up the signal, upon determining that the consecutive subset meets the following criteria: one or more digital signal values of the consecutive subset have amplitudes exceeding the predetermined threshold; a predetermined first number of digital signal values immediately preceding the consecutive subset have amplitudes below the predetermined threshold; and a predetermined second number of digital signal values immediately succeeding the consecutive subset have amplitudes above the predetermined threshold. In some of these embodiments, the predetermined first number and the predetermined second number are the same.

In some embodiments or instances of the above-summarized method, the identifying of at least a first one of the discrete and separated signal segments instead comprises identifying a consecutive subset of digital signal values, among the digital signal values making up the signal, upon determining that the consecutive subset meets the following criteria: one or more digital signal values of the consecutive subset have amplitudes exceeding the predetermined threshold; the consecutive subset does not include more than a first predetermined number of consecutive digital signal values having amplitudes below the predetermined threshold; the consecutive subset is no longer than a predetermined length; and the number of consecutive digital signal values immediately succeeding the consecutive subset and having amplitudes below the predetermined threshold is at least equal to the largest number of consecutive digital signal values within the consecutive subset and having amplitudes below the predetermined threshold.

In some embodiments, calculating the overshoot vector for each identified signal segment is performed according to:

$$u(i) = a(i)e^{j\varphi(i)} - be^{j\varphi(i)}, \text{ for } a(i) > b, \text{ else } u(i) = 0,$$

where u(i) is the calculated overshoot vector value for each complex-valued sample i in the identified signal segment, a(i) is the amplitude of each sample i, φ(i) is the argument of each sample i, and b is the predetermined threshold.

Alternatively, in some embodiments, calculating the overshoot vector for each identified signal segment is performed according to:

$$u(i) = s(i)\left(1 - \frac{b}{a(i)}\right), \text{ for } a(i) > b, \text{ else } u(i) = 0,$$

where u(i) is the calculated overshoot vector value for each complex-valued sample i in the identified signal segment, s(i) is the value of each sample i, a(i) is the amplitude of each sample i, and b is the predetermined threshold.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
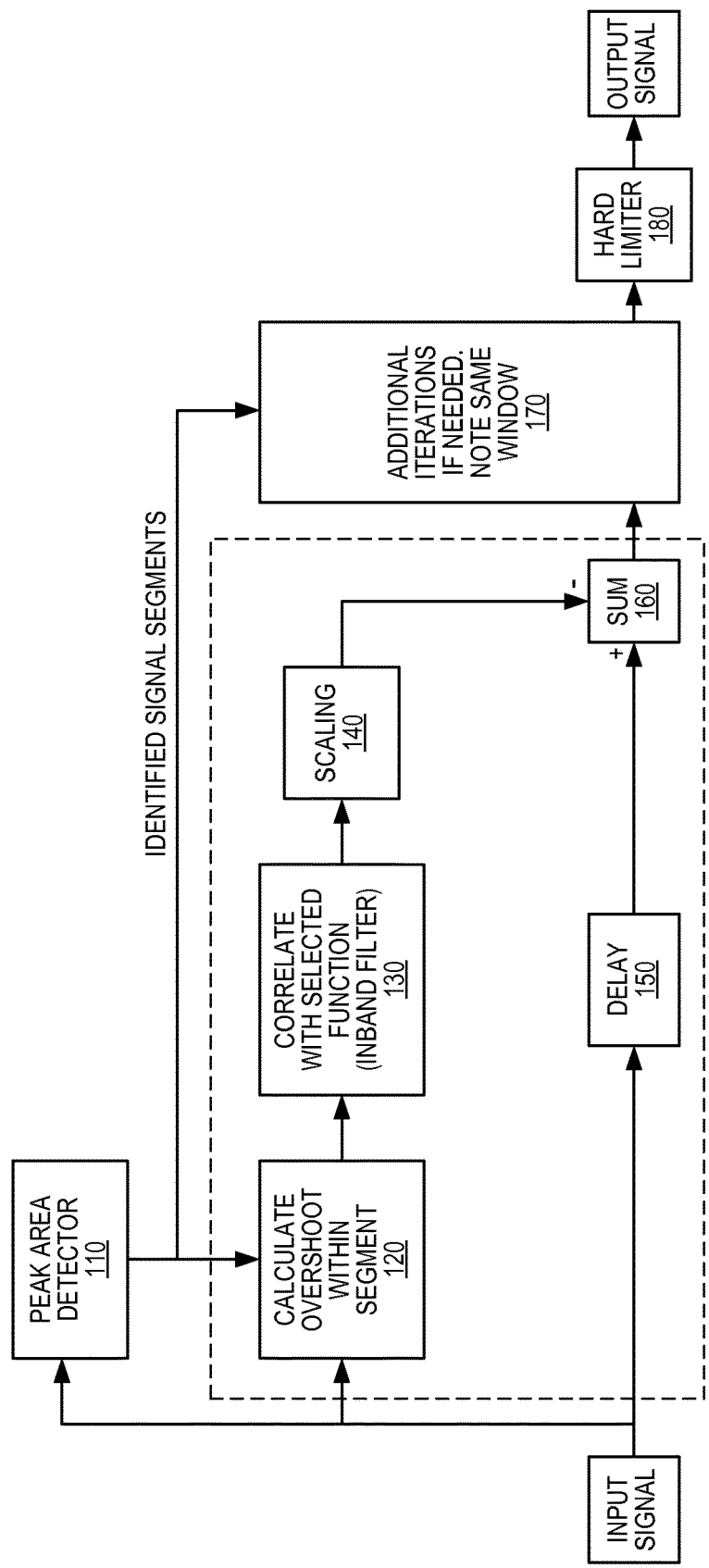
FIG. 1 is a block diagram illustrating functional elements of a crest-factor reduction circuit according to embodiments of the present invention.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, application-specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry, including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As suggested above, conventional crest factor reduction methods, when applied to aggregated modulated signals like might be found in systems supporting carrier aggregation, can be costly and computationally intensive. Statistical analysis of aggregated modulated signals show that only small portions of the signal to be amplified typically have an amplitude above the threshold level, provided that the threshold level is not too close to the root-mean-square (RMS) value of the signal. This provides an opportunity to reduce the computations required to perform effective crest factor reduction.

FIG. 1 is a block diagram illustrating signal processing operations of a crest factor reduction technique that addresses the issues raised above. The input signal to the illustrated operations may be a complete aggregated baseband signal for all carriers in a carrier aggregated signal to be transmitted by a wireless base station, for example. The methods described herein do not rely on any particular assumption with respect to oversampling. In an example scenario, a sample rate of 46.08 Mega-samples per second (MSps) may be used, for a signal with a 40 MHz bandwidth.

Block 110 of FIG. 1 illustrates a peak area detector. The peak area detector should provide a good approximation of all peak values in the input signal that are above a desired peak-to-average threshold. Further, the peak area detector is preferably able to identify peaks that fall between samples. A simple solution is to oversample the input signal, and study the peak values of oversampled signal.

Peak area detector 110 detects overshoot positions, where samples have amplitude above a predetermined threshold. Based on observed statistics of aggregated carrier signals, it is highly likely to have a number of sharp peaks in close proximity to one another. This can be seen in FIG. 2, which illustrates an example input signal 20, having several peaks that range above a threshold 25; peaks 22, 23, and 24 are particularly close to one another. Peak area detector 110 thus identifies non-overlapping signal segments that each include at least one peak value that exceeds the predetermined threshold, but may include several associated peaks. One of these identified segments is illustrated as segment 26 in FIG. 2. The value of the predetermined threshold depends on the expected signal statistics and the desired peak-to-average value; an example threshold level is +7 dBc.

Figure 2:
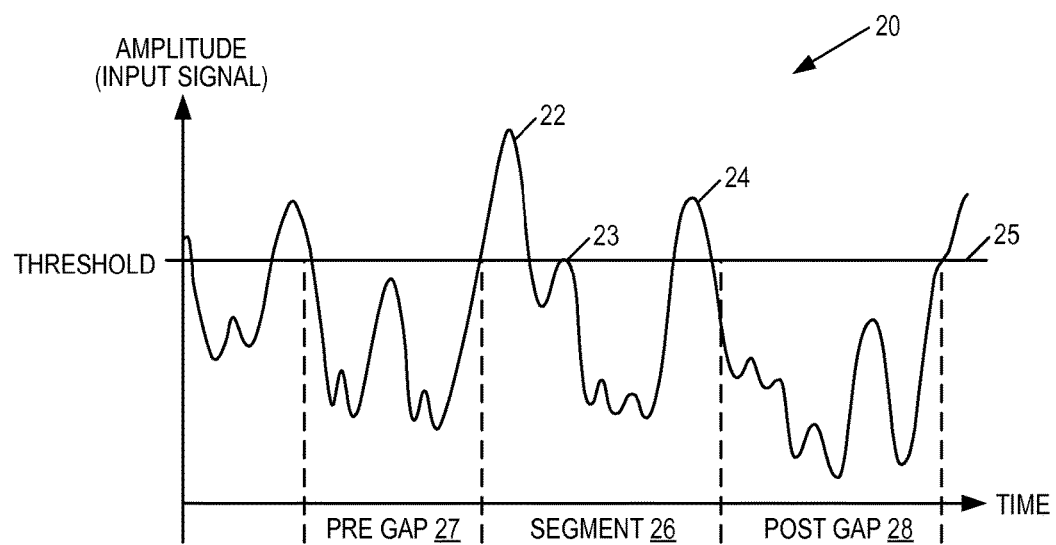
FIG. 2 illustrates an example input signal, prior to crest-factor reduction.

As detailed below, the identified signal segments generally include predetermined numbers of preceding samples and concluding samples that are below the threshold—this isolates the impact of the signal processing performed by subsequent processing blocks in such a way that the compensation applied to each identified signal segment has no effect on the portions surrounding the identified signal segment. In FIG. 2, a "pre-gap" segment 27 and a "post-gap" segment 28 are shown; each of these segments includes portions of the signal that remain below the threshold 25. As detailed below, the identification of the signal segments may be carried out so as to ensure that the pre-gap segment and/or the post-gap segment are of certain predetermined minimum lengths, respectively.

An example algorithm for this segment identification is as follows. First, it will be appreciated that the input signal may be represented as either $s(i)=I(i)+jQ(i)$ or $s(i)=a(i)e^{j\varphi(i)}$. If the input signal is represented in the first (Cartesian) form, it will be necessary to calculate the amplitude $a(i)$ for each value, as the algorithm operates on the amplitudes of the signal values. Next, signal segments are identified, where a given signal segment includes data values $i \in \{i_{start} \ldots i_{stop}\}$ where:

$a(i)$ is above the threshold somewhere within the signal segment;

the number of samples with amplitudes below the threshold and directly preceding the first overshoot is at least $N_{pre\ gap}$;

the number of samples with amplitudes below threshold directly succeeding the last overshoot is at least $N_{post\ gap}$, if possible; and if the number of samples in the segment is growing beyond a predetermined limit, i.e., $(i_{stop}-i_{start}) > N_{area\ length\ limit}$, then the segments ends with an overshoot succeeded by the longest gap within the segment.

The predetermined values $N_{pre\ gap}$, $N_{post\ gap}$, and $N_{area\ length\ limit}$ all relate to the length of a selected in-band filter that will be used to filter the identified segments. A conservative approach is to set both $N_{pre\ gap}$ and $N_{post\ gap}$ to equal the length of the in-band filter. Either or both could be reduced by as much as a factor of two, however. A good selection for $N_{area\ length\ limit}$ is three times the filter selection. In simulations mimicking expected real-world signals, this resulted in very few situations where it was not possible to identify segments with the required pre- and post-gap sections.

As seen in FIG. 1, the identified signal segments are provided to subsequent processing blocks by the peak area detector 110. The purpose of peak area detector 110 is to define segments that can be locally compensated without impact on other regions of the signal. All in-band compensation applied within a given one of the identified signal segments is kept within the signal segment.

It will be appreciated that the identified signal segments considered together will typically comprise only a small fraction of the total signal. This results in a big reduction in the signal processing work needed to calculate compensation signal.

As shown at block 120, an overshoot vector is calculated for each identified segment. Thus, for each segment, calculate overshoot vector:

$$u(i) = a(i)e^{j\varphi(i)} - be^{j\varphi(i)} = s(i)\left(1 - \frac{b}{a(i)}\right), a(i) > b, \text{ else } u(i) = 0,$$

where b is a threshold. Note that no phase calculation is needed. The threshold used here may be the required threshold on the output, but could be different, in some embodiments.

Figure 3:
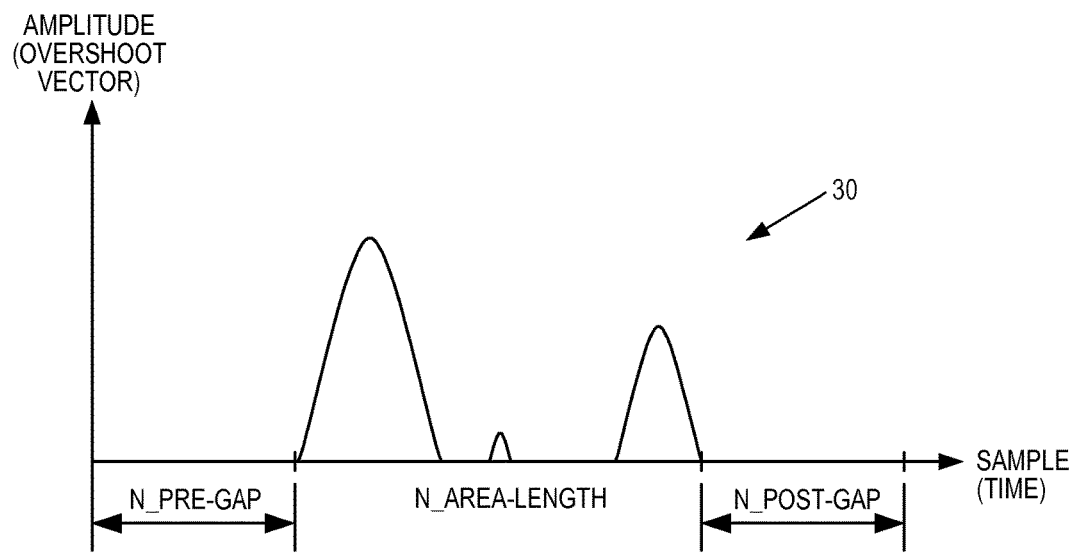
FIG. 3 illustrates an example overshoot vector.

FIG. 3 illustrates an example overshoot vector 30, corresponding to the input signal in FIG. 2, where the overshoot vector is calculated using the same threshold 25 shown in FIG. 2. It can be seen that the overshoot vector 30 reflects the same peaks 22, 23, and 24 seen in FIG. 2.

The information in the calculated overshoot vector will have more frequency content than the original signal. Thus, an oversampled signal is needed when creating the vector. After the overshoot vector has been created, the sample rate can be reduced, e.g., as part of the in-band filtering. It will also be appreciated that the overshoot vector has less energy than the original signal. The amplitude is less and the total quantization energy is much smaller, since the total overshoot energy is small. Hence, the number of bits used can be reduced compared to the original signal.

Figure 4:
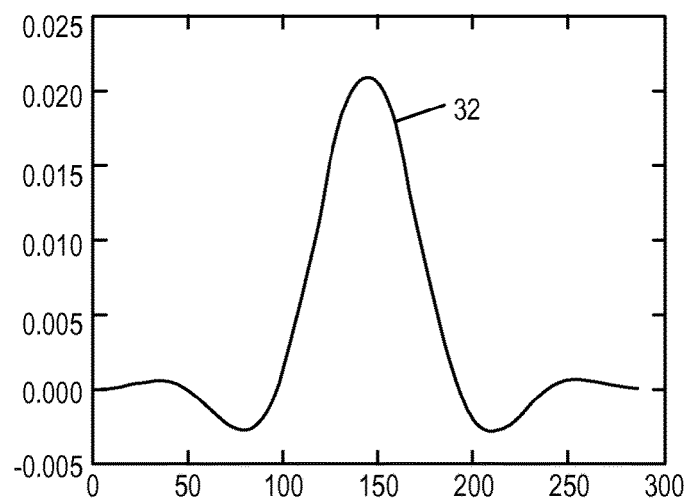
FIG. 4 is a time-domain representation of an example in-band filter function.

As shown at block 130 in FIG. 1, each identified signal segment is then correlated with a selected filtering function, i.e., filtered using an in-band filter. An example filtering function 32, represented in the time domain, is illustrated in FIG. 4. This correlating/filtering is performed separately, on each identified segment. As noted above, the identified signal segments have beginning sections and ending sections of $N_{pre\ gap}$ and $N_{post\ gap}$ samples, respectively, where the sample values in the original signal do not exceed the threshold value. The calculated overshoot vectors should thus have corresponding beginning sections and end sections of $N_{pre\ gap}$ and $N_{post\ gap}$ samples, with values of zero. Each overshoot vector is filtered by a pre-defined in-band filter, so as to provide the best picture of the in-band portions of the overshoot vector. Note that this in-band filter may have multiple pass-bands, to account for aggregated carrier signals that are separated in frequency.

In-band filters are selected in view of balancing the requirements that they pass the majority of in-band frequencies, have stop bands elsewhere, and have a short impulse response. Basic filters need to be identified for each bandwidth used. Filters for non-contiguous carriers are frequency translated to correct center frequencies, with respect to the aggregated baseband signal, and combined into one filter. The filter realization can be optimized from a cost point of view.

A conservative approach to defining an in-band filter is start by selecting raised-cosine functions, with scaling, bandwidths, filter lengths, and frequency offsets to fit the sample rate. For example, consider a scenario with non-contiguous 5-MHz bands, for an LTE carrier aggregation scenario, with the two bands located at +/−17.5 MHz in the digital baseband signal. The filter design for each passband may be based on a raised-cosine filter, truncated to length a, with the stopbands starting at approximately +/−2.5 MHz, relative to the center of the passband. Assume a sample rate of 46.08 MHz, which is 12*3.84 MHz. For the purpose of identifying peaks, the signal might be up-sampled by a factor of 4, for example, resulting in an oversampling rate $f_s$ of 4*46.08 MHz, or 4*12*3.84 MHz. We can choose a filter bandwidth according to $f_{bw}$=c*3.84 MHz; an appropriate value for c may be 1. A filter β of 0.5 will have a stopband starting at about 2.9 MHz; in simulations, this proved to be good enough. Given this filter β, there was very low energy outside of +/−3T (where T=1/3.84 MHz), thus the length of the filter can be truncated to 6T, yielding a filter length a of 6. The parameters thus far selected can then be used to determine the number of samples, $$\text{according to} = a\frac{f_s}{f_{BW}} = a\frac{b}{c}.$$

In this example, $$N = a\frac{b}{c} = 6\frac{4*12}{1} = 288,$$

accounting for the four-times oversampling.

This filter is appropriate for one passband of a given bandwidth, and thus has to be moved to the correct carrier frequency to account for the carrier aggregation in the digital baseband signal. This can be done by shifting the filter response in the frequency domain; in this example, the frequency response is shifted so that its center is close to +17.5 MHz.

It will be appreciated that the overshoot vectors will typically have a lot of energy outside of the used frequency bands, a substantial portion of which will be removed by the in-band filtering performed on the overshoot vectors. This means that compensation performed using the filtered overshoot vectors will not compensate perfectly for peaks within the overshoot vector. The target here is to move peaks towards, and preferably below, the threshold.

As shown at block 140 in FIG. 1, the filtered overshoot vectors corresponding to the identified signal segments are then scaled. In some embodiments each filtered overshoot vector is scaled separately from the others, while in others the filtered overshoot vectors corresponding to multiple signal segments are scaled using a common scaling factor. Note that in the latter case, the scaling may be factored into the filtering operation, such that a separate scaling step is unnecessary.

A good method is to scale the filtered signal in such a way that the peak value in the filtered overshoot vector has the same amplitude as the maximum value within the unfiltered overshoot vector. As shown at block 160, each scaled, filtered, overshoot vector is then subtracted from the input signal, which has been delayed, as shown at block 150, to account for the processing delay in the compensation processing. The delay is selected to match total delay in all calculations. Once again note that it is typically only a small fraction of the input signal samples that will be corrected by this compensation.

In many cases, adequate performance is achieved with a single iteration. However, one or more additional iterations may be performed, as shown at block 170. Note that the same identified signal segments, with their newly compensated values, are processed in subsequent iterations; only the overshoot vector calculation, in-band filtering, scaling, and subtracting operations need to be repeated, with the compensated signal from one iteration providing the input signal for the subsequent iteration. The processing for each subsequent iteration thus begins with the calculation of a new overshoot vector for each identified signal segment, based on the compensated signal obtained from the previous iteration.

Figure 5:
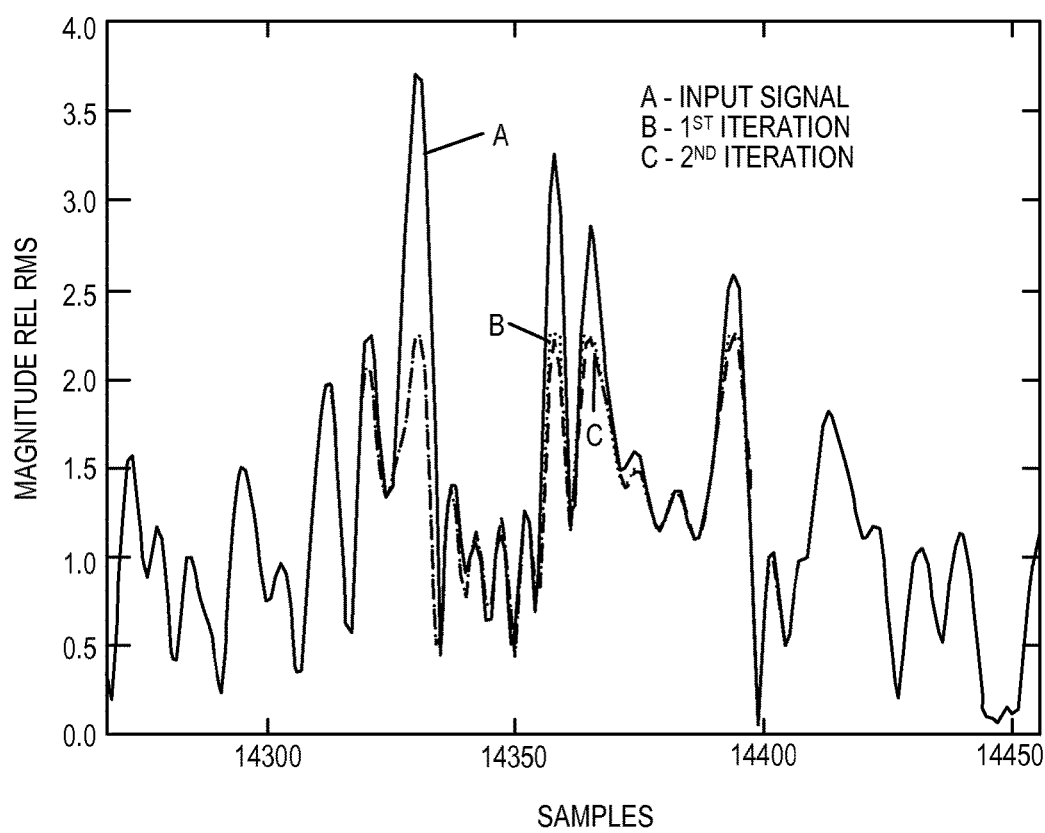
FIG. 5 illustrates compensated signals, according to an example.

FIG. 5 illustrates an example of compensated signals generated according to the technique described above. Signal A is the original input signal—it can be seen that it has peaks that extend considerably above the threshold 25. Signal B is a compensated signal obtained from a single iteration of the compensation technique, while signal C is the compensated signal obtained after two iterations.

It will be appreciated that the above compensations will remove all peaks above the threshold. Residual peaks exceeding the threshold may still remain, in some instances. Thus, the final compensated signal may be passed through a hard limiter 180, as shown in the block diagram, in some embodiments. This hard limiter 180 may typically be separate from the crest factor reduction processing—it will be appreciated that the crest factor reduction must be good enough that any subsequently applied hard limiting does not generate in-band or out-of-band distortion that exceeds system requirements.

Figure 6:
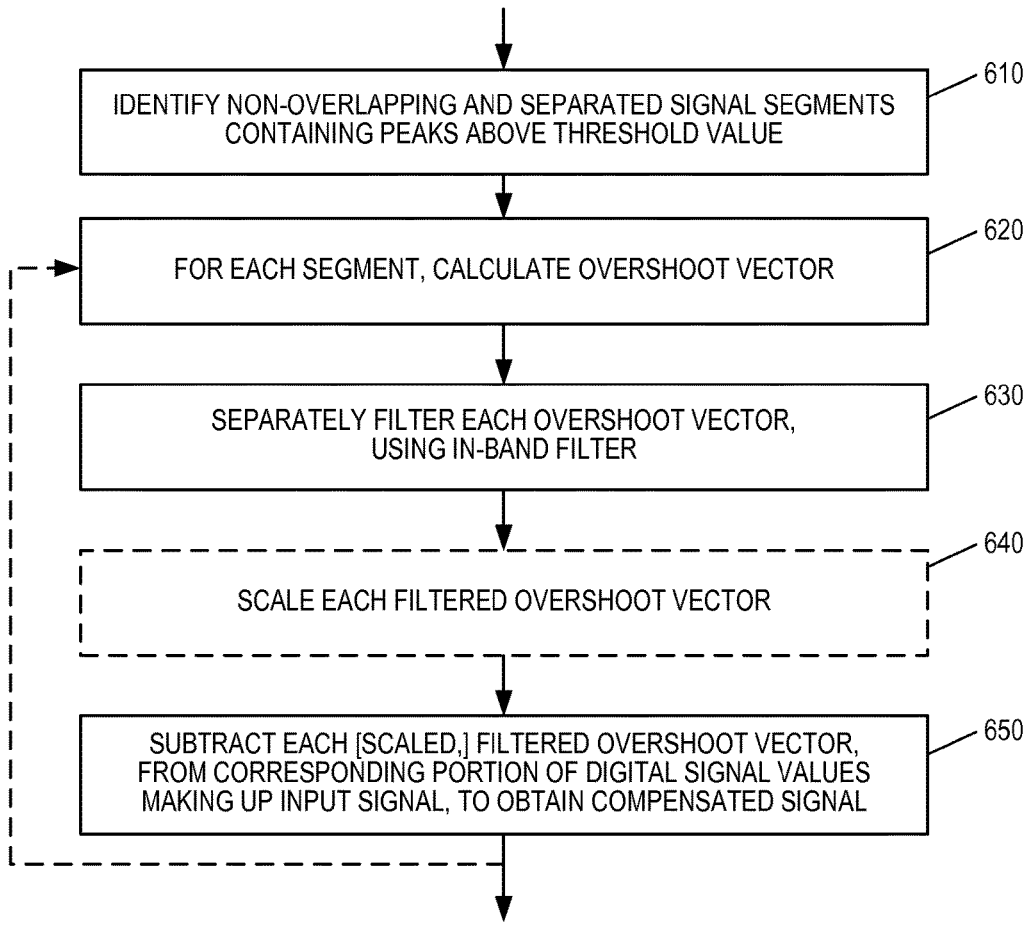
FIG. 6 is a process flow diagram illustrating an example method according to some embodiments.

FIG. 6 is a process flow diagram illustrating an example method of processing a signal in a radio transmitter, according to the presently disclosed techniques. In a first phase, the complete signal is analyzed to identify independent consecutive signal areas having amplitudes above the threshold. In the disclosed methods, this identification is done so as to ensure that there is a minimum distance between these identified areas, which are referred to as "signal segments" in the discussion that follows. Thus, this first phase of the crest factor reduction process, illustrated at block 610 of FIG. 6, comprises identifying, in a sequence of digital signal values making up an signal, a plurality of non-overlapping and separated signal segments, each identified signal segment corresponding to an interval of the signal in which the amplitude of at least one of the digital signal values exceeds a predetermined threshold value. Again, this identifying comprises ensuring that each identified signal segment is separated from all other identified signal segments by at least a predetermined number of digital signal values.

Once this identification is performed, the significant remaining signal processing work for the crest factor reduction is performed only on these identified signal segments. Because the information content in these segments typically represents only a small portion of total information, the computational intensity is reduced compared to conventional techniques, and the overall distortion to the signal is kept low.

Blocks 620-650 of FIG. 6 illustrate the signal processing that is carried for each segment of the signal identified in the first part of the crest factor reduction process. First, as shown at block 620, an overshoot vector is calculated, for each identified portion. This overshoot vector represents the information above a threshold value, e.g., the extent to which the identified signal segment exceeds the predetermined threshold mentioned above.

As shown at block 630, the overshoot vector for each identified segment is separately filtered, using an in-band filter, i.e., a filter having one or more pass-bands covering the used frequencies in the input signal to the process, and a stop-band outside of these used frequencies. As shown at block 640, the filtered overshoot vector for each identified signal segment is then scaled. This block is illustrated with a dashed outline in FIG. 6, to indicate that a separate and distinct scaling step may not appear in all embodiments or instances of the illustrated method. In some embodiments, each of the filtered overshoot vectors is separately scaled, to have a maximum equal to or approximately equal to the maximum amplitude of the corresponding identified signal segment. In other words, each filtered overshoot vector is scaled in such a way that the maximum value of the filtered overshoot has the same value as the unfiltered overshoot vector.

With the calculating, filtering, and scaling operations of blocks 620-640, a correction vector for each identified segment has been calculated. This correction vector is subtracted from the corresponding area of the input signal. Thus, as shown at block 650, the method further comprises subtracting each scaled, filtered, overshoot vector from the corresponding portion of the digital signal values making up the input signal, to obtain a compensated signal having a reduced crest factor. This compensated signal, or a signal derived therefrom, may then be amplified, upconverted, and/or used to modulate a carrier signal, e.g., for transmission by a base station or a mobile device.

It will be appreciated that the operations of blocks 620-650 can be repeated, using the output from block 650 for one iteration as the input to block 620 for a subsequent iteration. It will be appreciated that there is no need to re-identify the signal segments, i.e., the same signal segments can be processed in one or more iterations of the method.

In some embodiments of the method illustrated in FIG. 6, the identifying operation illustrated at block 610 comprises, for at least a first one of the plurality of non-overlapping and separated signal segments, identifying a consecutive subset of digital signal values, among the digital signal values making up the signal, upon determining that the consecutive subset meets the following criteria: one or more digital signal values of the consecutive subset have amplitudes exceeding the predetermined threshold; a predetermined first number of digital signal values immediately preceding the consecutive subset have amplitudes below the predetermined threshold; and a predetermined second number of digital signal values immediately succeeding the consecutive subset have amplitudes above the predetermined threshold. The predetermined first number and second number may or may not be the same, in various embodiments.

In some embodiments or instances, the identifying operation shown at block 610 may instead comprise, for at least one of the plurality of the non-overlapping and separated signal segments, identifying a consecutive subset of digital signal values, among the digital signal values making up the signal, upon determining that the consecutive subset meets the following criteria: one or more digital signal values of the consecutive subset have amplitudes exceeding the predetermined threshold; the consecutive subset does not include more than a first predetermined number of consecutive digital signal values having amplitudes below the predetermined threshold; the consecutive subset is no longer than a predetermined length; and the number of consecutive digital signal values immediately succeeding the consecutive subset and having amplitudes below the predetermined threshold is at least equal to the largest number of consecutive digital signal values within the consecutive subset and having amplitudes below the predetermined threshold.

In some embodiments of the method shown in FIG. 6, calculating the overshoot vector for each identified signal segment is performed according to:

$$u(i) = a(i)e^{j\varphi(i)} - be^{j\varphi(i)}, \text{ for } a(i) > b, \text{ else } u(i) = 0,$$

where $u(i)$ is the calculated overshoot vector value for each complex-valued sample $i$ in the identified signal segment, $a(i)$ is the amplitude of each sample $i$, $\varphi(i)$ is the argument of each sample $i$, and $b$ is the predetermined threshold. In some other embodiments, calculating the overshoot vector for each identified signal segment is performed according to:

$$u(i) == s(i)\left(1 - \frac{b}{a(i)}\right), \text{ for } a(i) > b, \text{ else } u(i) = 0,$$

where $u(i)$ is the calculated overshoot vector value for each complex-valued sample $i$ in the identified signal segment, $s(i)$ is the value of each sample $i$, $a(i)$ is the amplitude of each sample $i$, and $b$ is the predetermined threshold.

Figure 7:
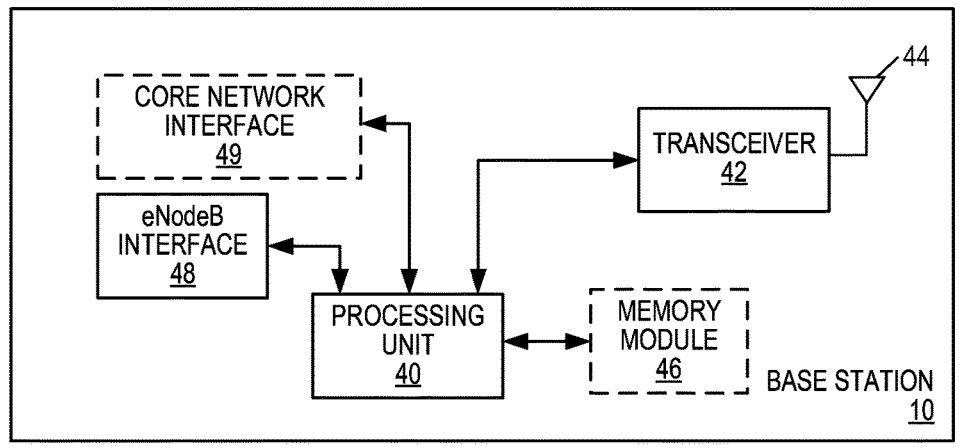
FIG. 7 is a block diagram illustrating an example base station in which the presently disclosed techniques may be employed.

FIG. 7 illustrates an example base station 10 in which the above-described techniques may be employed. Base station 10 may be referred to, in various contexts, as a NodeB or eNodeB. Base station 10 may be a macro base station (i.e., providing coverage over a relatively large area), or a small base station (variously referred to as micro, pico, or femto base stations, or home base stations); although a macro base station will not in practice be identical in size and structure to a micro base station, these different examples of base station 10 will generally include similar or corresponding components, although the details of each of those components may vary to accommodate the different operational requirements of a particular embodiment.

The illustrated base station 10 comprises a processing module 40 that controls the operation of the base station 10 and that further provides signal processing for signals transmitted and received by the base station. The processing module 40, which may comprise one or more microprocessors, microcontrollers, digital signal processors, specialized digital logic, etc., is connected to a transceiver module 42 with associated antenna(s) 44, which are used to transmit signals to, and receive signals from, wireless devices in the network. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

The base station 10 also includes components and/or circuitry 48 for allowing the base station 10 to exchange information with other base stations 10 (for example, via an interface defined by the appropriate wireless network standards) and components and/or circuitry 49 for allowing the base station 10 to exchange information with nodes in a core network (again, for example, via an interface defined by wireless network standards). It will be appreciated that base stations for use in various types of network (e.g., GSM/GPRS, UTRAN or WCDMA RAN) will include similar components to those shown in FIG. 7 and appropriate interface circuitry 48, 49 for enabling communications with the other network nodes in those types of networks (e.g., for communications with other base stations, mobility management nodes and/or nodes in the core network).

The processing module 40 and memory module 46, which may be collectively referred to as "processing circuitry" are configured to carry out crest factor reduction according to one or more of the techniques described herein. Some or all of the operations shown in the process flow of FIG. 6, for example, may be carried out by a programmable DSP, for example, executing firmware and/or software stored in memory module 46. Some or all of the operations may be carried out using customized digital logic, instead. A combination of DSP processing and digital logic may be used, in some embodiments.

It will be appreciated that while FIG. 7 illustrates an example base station 10, the techniques may also be employed in a mobile device or in another type of radio transmitter device, in some embodiments. Such a device will have components generally corresponding to processing module 40, memory module 46, and transceiver module 42, with their respective detailed designs being tailored for the mobile environment and operation.

The techniques and apparatuses described can be implemented to provide a low cost solution that has good enough performance to support small cell implementations using non-contiguous band combinations. This is achieved by splitting the implementation into the two parts detailed above. First, a peak area detector works with all data in the input signal. The output from this detector defines areas having peaks above the defined threshold and at the same time having pre- and post-gaps. Statistical analysis on typical aggregated carrier signals show that segments identified according to this approach contain less than 10% of the total input signal data, hence the subsequent work to calculate a compensation signal is reduced by at least 90%.

The processing following the peak detection, to create an in-band peak cancellation signal, can be performed on the identified segments separately. This is much more efficient than defining a common algorithm, since local adaptions such as the scaling factor can be optimized for each area. This minimizes the need for further iterations, and also reduces the number of calculations.

Segments for processing are identified so as to ensure that compensation signals in different segments will be non-overlapping, with no risk of creating new peaks when added. This removes the need to reiterate the peak area detection for every iteration. It also improves performance and reduces the need to add additional iterations. Analysis of the techniques described herein show that the performance can be sufficient with one iteration. However, results can be further enhanced by adding additional iterations. There is no need to re-identify the signal segments for subsequent iterations; the same segments can be operated on in the succeeding iterations.

Examples of several embodiments of the present techniques have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The illustrative embodiments discussed above are thus to be considered in all respects as illustrative and not restrictive.

What is claimed is:

1. A method of processing a signal in a radio transmitter, the method comprising:
    identifying, in a sequence of digital signal values making up a signal, a plurality of non-overlapping and separated signal segments, each identified signal segment corresponding to an interval of the signal in which the amplitude of at least one of the digital signal values exceeds a first predetermined threshold value, wherein said identifying comprises ensuring that each identified signal segment is separated from all other identified signal segments by at least a predetermined number of digital signal values;
    for each identified signal segment, calculating an overshoot vector representing the extent by which the identified signal segment exceeds a second predetermined threshold value;
    separately filtering each overshoot vector with a predefined digital filter having one or more passbands corresponding to in-band portions of the signal; and
    subtracting each filtered overshoot vector from the corresponding portion of the digital signal values making up the signal, to obtain a compensated signal having a reduced crest factor,
    wherein the predetermined number of digital signal values is at least equal to one-half the length of the predefined digital filter.

2. The method of claim 1, wherein the first predetermined threshold value and the second predetermined threshold value are the same.

3. The method of claim 1, wherein the method further comprises scaling the filtered overshoot vectors, and wherein subtracting each filtered overshoot vector from the corresponding portion of the digital values making up the signal comprises subtracting each scaled, filtered, overshoot vector from the corresponding portion of the digital values making up the signal.

4. The method of claim 3, wherein scaling the filtered overshoot vectors comprises separately scaling each filtered overshoot vector to have a maximum amplitude equal to or approximately equal to the maximum amplitude of the corresponding identified signal segment.

5. The method of claim 1, further comprising modulating a carrier signal using the compensated signal or a signal derived from the compensated signal.

6. The method of claim 1, wherein the method further comprises generating a second compensated signal by:
for each of one or more of the identified signal segments, calculating a second overshoot vector representing the extent by which the digital signal values of the compensated signal exceed the predetermined threshold, within the interval corresponding to the identified signal segment;
separately filtering each second overshoot vector with the predefined digital filter;
separately scaling each filtered second overshoot vector to have a maximum amplitude equal to or approximately equal to the maximum amplitude of the compensated signal within the interval of the corresponding identified signal segment; and
subtracting each scaled, filtered, second overshoot vector from the corresponding portion of the digital signal values making up the compensated signal, to obtain the second compensated signal.

7. The method of claim 1, wherein the identifying of at least one of the non-overlapping and separated signal segments comprises identifying a consecutive subset of digital signal values, among the digital signal values making up the signal, upon determining that the consecutive subset meets the following criteria:
one or more digital signal values of the consecutive subset have amplitudes exceeding the predetermined threshold;
a predetermined first number of digital signal values immediately preceding the consecutive subset have amplitudes below the predetermined threshold; and
a predetermined second number of digital signal values immediately succeeding the consecutive subset have amplitudes above the predetermined threshold.

8. The method of claim 7, wherein the predetermined first number and the predetermined second number are the same.

9. The method of claim 1, wherein the identifying of at least one of the discrete and separated signal segments comprises identifying a consecutive subset of digital signal values, among the digital signal values making up the signal, upon determining that the consecutive subset meets the following criteria:
one or more digital signal values of the consecutive subset have amplitudes exceeding the predetermined threshold;
the consecutive subset does not include more than a first predetermined number of consecutive digital signal values having amplitudes below the predetermined threshold;
the consecutive subset is no longer than a predetermined length; and
the number of consecutive digital signal values immediately succeeding the consecutive subset and having amplitudes below the predetermined threshold is at least equal to the largest number of consecutive digital signal values within the consecutive subset and having amplitudes below the predetermined threshold.

10. The method of claim 1, wherein calculating the overshoot vector for each identified signal segment is performed according to:

$$u(i)=a(i)e^{j\varphi(i)}-be^{j\varphi(i)}, \text{ for } a(i)>b, \text{ else } u(i)=0;$$

where $u(i)$ is the calculated overshoot vector value for each complex-valued sample i in the identified signal segment, $a(i)$ is the amplitude of each sample i, $\varphi(i)$ is the argument of each sample i, and b is the predetermined threshold.

11. The method of claim 1, wherein calculating the overshoot vector for each identified signal segment is performed according to:

$$u(i)==s(i)(1-b/a(i)), \text{ for } a(i)>b, \text{ else } u(i)=0;$$

where $u(i)$ is the calculated overshoot vector value for each complex-valued sample i in the identified signal segment, $s(i)$ is the value of each sample i, $a(i)$ is the amplitude of each sample i, and b is the predetermined threshold.

12. A radio transmitter device comprising:
a radio transceiver; and
processing circuitry configured to:
identify, in a sequence of digital signal values making up a signal, a plurality of non-overlapping and separated signal segments, each identified signal segment corresponding to an interval of the signal in which the amplitude of at least one of the digital signal values exceeds a first predetermined threshold value, wherein said identifying comprises ensuring that each identified signal segment is separated from all other identified signal segments by at least a predetermined number of digital signal values;
for each identified signal segment, calculate an overshoot vector representing the extent by which the identified signal segment exceeds a second predetermined threshold value;
separately filter each overshoot vector with a predefined digital filter having one or more passbands corresponding to in-band portions of the signal;
subtract each filtered overshoot vector from the corresponding portion of the digital signal values making up the signal, to obtain a compensated signal having a reduced crest factor; and
provide the compensated signal or a signal derived from the compensated signal to the radio transceiver,
wherein the predetermined number of digital signal values is at least equal to one-half the length of the predefined digital filter.

13. The radio transmitter device of claim 12, wherein the first predetermined threshold value and the second predetermined threshold value are the same.

14. The radio transmitter device of claim 12, wherein the processing circuitry is further configured to scale the filtered overshoot vectors and to subtract each filtered overshoot vector from the corresponding portion of the digital values making up the signal by subtracting each scaled, filtered, overshoot vector from the corresponding portion of the digital values making up the signal.

15. The radio transmitter device of claim 14, wherein the processing circuitry is configured to separately scale each filtered overshoot vector to have a maximum amplitude equal to or approximately equal to the maximum amplitude of the corresponding identified signal segment.

16. The radio transmitter device of claim 12, wherein the radio transmitter device is configured to modulate a carrier signal using the compensated signal or a signal derived from the compensated signal.

17. The radio transmitter device of claim 12, wherein the processing circuitry is further configured to generate a second compensated signal by:
for each of one or more of the identified signal segments, calculating a second overshoot vector representing the extent by which the digital signal values of the compensated signal exceed the predetermined threshold, within the interval corresponding to the identified signal segment;
separately filtering each second overshoot vector with the predefined digital filter;
separately scaling each filtered second overshoot vector to have a maximum amplitude equal to or approximately equal to the maximum amplitude of the compensated signal within the interval of the corresponding identified signal segment; and
subtracting each scaled, filtered, second overshoot vector from the corresponding portion of the digital signal values making up the compensated signal, to obtain the second compensated signal; and
wherein the processing circuitry is further configured to provide the second compensated signal or a signal derived from the second compensated signal to the radio transceiver.

18. The radio transmitter device of claim 12, wherein the processing circuitry is configured to identify at least one of the non-overlapping and separated signal segments by identifying a consecutive subset of digital signal values, among the digital signal values making up the signal, upon determining that the consecutive subset meets the following criteria:
one or more digital signal values of the consecutive subset have amplitudes exceeding the predetermined threshold;
a predetermined first number of digital signal values immediately preceding the consecutive subset have amplitudes below the predetermined threshold; and
a predetermined second number of digital signal values immediately succeeding the consecutive subset have amplitudes above the predetermined threshold.

19. The radio transmitter device of claim 18, wherein the predetermined first number and the predetermined second number are the same.

20. The radio transmitter device of claim 12, wherein the processing circuitry is configured to identify at least one of the discrete and separated signal segments by identifying a consecutive subset of digital signal values, among the digital signal values making up the signal, upon determining that the consecutive subset meets the following criteria:
one or more digital signal values of the consecutive subset have amplitudes exceeding the predetermined threshold;
the consecutive subset does not include more than a first predetermined number of consecutive digital signal values having amplitudes below the predetermined threshold;
the consecutive subset is no longer than a predetermined length; and
the number of consecutive digital signal values immediately succeeding the consecutive subset and having amplitudes below the predetermined threshold is at least equal to the largest number of consecutive digital signal values within the consecutive subset and having amplitudes below the predetermined threshold.

21. A crest-factor reduction circuit for use in a radio transmitter device, wherein the crest-factor reduction circuit is adapted to:
identify, in a sequence of digital signal values making up a signal, a plurality of non-overlapping and separated signal segments, each identified signal segment corresponding to an interval of the signal in which the amplitude of at least one of the digital signal values exceeds a first predetermined threshold value, wherein said identifying comprises ensuring that each identified signal segment is separated from all other identified signal segments by at least a predetermined number of digital signal values;
for each identified signal segment, calculate an overshoot vector representing the extent by which the identified signal segment exceeds a second predetermined threshold value;
separately filter each overshoot vector with a predefined digital filter having one or more passbands corresponding to in-band portions of the signal; and
subtract each filtered overshoot vector from the corresponding portion of the digital signal values making up the signal, to obtain a compensated signal having a reduced crest factor,
wherein the predetermined number of digital signal values is at least equal to one-half the length of the predefined digital filter.

22. A base station comprising the crest-factor reduction circuit of claim 21.

23. A non-transitory computer-readable medium comprising, stored thereupon, a computer program product comprising instructions that, when executed in a processing circuit of a radio transmitter, cause the processing circuit to:
identify, in a sequence of digital signal values making up a signal, a plurality of non-overlapping and separated signal segments, each identified signal segment corresponding to an interval of the signal in which the amplitude of at least one of the digital signal values exceeds a first predetermined threshold value, wherein said identifying comprises ensuring that each identified signal segment is separated from all other identified signal segments by at least a predetermined number of digital signal values;
for each identified signal segment, calculate an overshoot vector representing the extent by which the identified signal segment exceeds a second predetermined threshold value;
separately filter each overshoot vector with a predefined digital filter having one or more passbands corresponding to in-band portions of the signal; and
subtract each filtered overshoot vector from the corresponding portion of the digital signal values making up the signal, to obtain a compensated signal having a reduced crest factor,
wherein the predetermined number of digital signal values is at least equal to one-half the length of the predefined digital filter.

* * * * *